United States Patent [19]

Brown

[11] Patent Number: 5,311,194

[45] Date of Patent: May 10, 1994

[54] GPS PRECISION APPROACH AND LANDING SYSTEM FOR AIRCRAFT

[75] Inventor: Alison K. Brown, Monument, Colo.

[73] Assignee: NAVSYS Corporation, Colorado Springs, Colo.

[21] Appl. No.: 945,300

[22] Filed: Sep. 15, 1992

[51] Int. Cl.$^5$ .................. H04B 7/185; G01S 5/02
[52] U.S. Cl. .................... 342/357; 342/410
[58] Field of Search ................ 342/357, 410, 411, 413

[56] References Cited

U.S. PATENT DOCUMENTS

| | | | |
|---|---|---|---|
| 4,359,733 | 11/1982 | O'Neill | 343/6.5 LC |
| 4,701,760 | 10/1987 | Raoux | 340/993 |
| 4,774,672 | 9/1988 | Tsunoda et al. | 364/449 |
| 4,804,937 | 2/1989 | Barbiaux et al. | 340/52 F |
| 4,819,174 | 4/1989 | Furuno et al. | 364/444 |
| 4,866,450 | 9/1989 | Chisholm | 342/410 |
| 4,894,655 | 1/1990 | Joguet et al. | 340/988 |
| 5,014,206 | 5/1991 | Scribner et al. | 364/449 |
| 5,068,656 | 11/1991 | Sutherland | 340/989 |

FOREIGN PATENT DOCUMENTS 1298387 3/1992 Canada .
1298903 4/1992 Canada .

OTHER PUBLICATIONS

Navigation "Surveys" Summer, 1984, vol. 31, No. 2, by P. F. MacDoran et al.
Navigation Journal of The Institute of Navigation, vol. 32, No. 4, Winter, 1985-86, Printed in U.S.A., "Terrestrial Evaluation of the GPS Standard Positioning Service:" by Francis W. Mooney.
Navigation Journal of The Institute of Navigation, vol. 33, No. 4, Winter, 1986-1987, Printed in U.S.A., "DiffStar: A concept for Differential GPS in Northern Norway", by Hermod Fjereide.
Navigation Journal of the Institute of Navigation, vol. 36, No. 3, Fall, 1989, Printed in U.S.A., "Loran-C Vehicle Tracking in Detroit's Public Safety Dispatch System", by Laurence J. Cortland.
GPS World, News and Applications of the Global Positioning System, Mar./Apr. 1990.
L. Hogle, "Investigation of the Potential Application of GPS for Precision Approaches," Navigation, the Journal of the Institute of Navigation, vol. 35, No. 3, Fall, 1988.
A. J. Van Dierendonck, "Concepts for Replacing Shipboard Tacan with Differential GPS," ION Satellite Division Third Internation Technical Meeting, Sep., 1990.
"RTCM Recommended Standards for Differential Navstar GPS Service," Version 2.0 RTCM Special Committee No. 104, Jan. 1990.
H. Landau and G. Hein, "Precise Real-Time Differential GPS Positioning Using On-the-fly Ambiguity Resolution," Proceedings of the RION Satellite Navigation Conference, London, England, Nov., 1991.
R. Braff and R. Loh, "Analysis of Stand-Alone Differential GPS for Precision Approach," Proceedings of the RION Satellitte Navigation Conference, London, England, Nov., 1991.
P. C. Ould and R. J. VanWechel, "All-Digital GPS Receiver Mechanization," Global Positioning System Papers, vol. II, pp. 25-35, published by the Institute of Navigation.

*Primary Examiner*—Theodore M. Blum
*Attorney, Agent, or Firm*—William E. Hein

[57] ABSTRACT

A GPS precision approach and landing system for aircraft employs a fixed ground facility and a single satellite navigation receiver on board the aircraft. The fixed ground facility includes a reference receiver that measures differential corrections to the satellite code and carrier measurements and a pseudolite that is employed to transmit these corrections to a broadband GPS receiver on board the aircraft and to provide an additional code and carrier measurement to assist in the navigation solution. The pseudolite signal is broadcast at a frequency offset from the L1 GPS frequency in order to prevent interference with the satellite navigation system. The broadband GPS receiver on board the aircraft is capable of making phase coherent measurements from the GPS satellites, the pseudolite signal, and the GLONASS satellites. These phase coherent measurements are combined to form a precise differential carrier ranging (DCR) solution that is used to provide three-dimensional position guidance of the aircraft throughout a precision approach and landing procedure.

13 Claims, 15 Drawing Sheets

| Description | No/Frame | Bits | Format |
|---|---|---|---|
| 1-Word Header | 1 | 30 | SC-104 Preamble, STN ID, SV count |
| Second Word | 1 | 30 | Z-count, Health, UDRE |
| SV ID | x Ns | 5 | 1 - 32 |
| DCR (t0) | x Ns | 20 | LSB = 1 mm (+/- 524.288 m) |
| DCRR (t0) | x Ns | 15 | LSB = 0.5 mm/s (+/- 0.75 m/s) |
| 2xI | x Ns | 8 | LSB = $\lambda_{L1} 2^{-8}$ (0.74 mm) |
| Parity | x Ns | 12 | ICD-GPS-200 |
| Total | Ns = 6 | 420 | @1000 bps $F_{FR}$=1/0.42s |
| Total | Ns = 7 | 480 | @1000 bps $F_{FR}$=1/0.48s |
| Total | Ns = 8 | 540 | @1000 bps $F_{FR}$=1/0.54s |

FIG. 14

GPS PRECISION APPROACH AND LANDING SYSTEM FOR AIRCRAFT

ORIGIN OF THE INVENTION

This invention was made with United States Government support under Contract No. DTRS-57-91-C-00130 awarded by the Federal Aviation Administration (FAA) and under Contract No. DAAH01-92-C-R010 awarded by the Defense Advanced Research Projects Agency (DARPA). The United States Government has certain rights in this invention.

BACKGROUND OF THE INVENTION

This invention relates generally to a more precise, reliable, and continuous navigation system using the GPS or GLONASS satellite based radionavigation system and more particularly to use of this navigation system as a precision approach and landing system for aircraft.

The Global Positioning System (GPS) is a widely used satellite-based navigation system consisting of a network of satellites broadcasting pseudo-random noise (PRN) codes modulated on an L-band carrier (1575.43 MHz). A GPS receiver uses measurements of the PRN code-phase from four or more satellites to solve for the three-dimensional position of the receiver and to calibrate its internal time reference. The GPS receiver determines velocity from measurements of the carrier phase and doppler. Accuracy of the GPS solution is limited by the errors on the GPS signals and the geometry established by the positions of the satellites relative to the user. Presently, neither the precision nor the coverage of the standard positioning service provided by the proposed 21-satellite constellation meets the requirements for a precision approach and landing system for aircraft.

A common method for improving the precision of the standard positioning service is to broadcast differential corrections to users of the service. A standard message format for these corrections is described in "RCTM Recommended Standards for Differential Navstar GPS Service," Version 2.0, RTCM Special Commitee No. 104, January, 1990. This method is used in the landing assistance system described in U.S. Pat. No. 4,894,655 to Joquet et al. In accordance with these prior art teachings, the GPS accuracy is improved through the transmission of differential GPS corrections on a radio channel according to the standards of the microwave landing system known as MLS. However, this method requires that the user aircraft carry both an MLS and a GPS receiver. Moreover, this method does not address the problem that the GPS satellite coverage is insufficient to provide a continuous and reliable precision approach and landing service. See Braff, R. and R. Loh, "Analysis of Stand-Alone Differential GPS for Precision Approach," Proceeding of the RION Satellite Navigation Conference, London, England, November, 1991. Differential GPS flight test results have also demonstrated that the accuracy provided using this method is only sufficient to meet a relaxed "Near CAT I" precision approach requirement. See Braff et al., supra, and L. Hogle, "Investigation of the Potential Application of GPS for Precision Approaches," NAVIGATION, The Journal of the Institute of Navigation, Vol. 35, No. 2, Fall, 1988.

Test results documented in the prior art have demonstrated that GPS can provide sufficient accuracy to meet precision approach and landing system requirements using the GPS carrier phase data to solve for the aircraft's position. See Landau, H. and G. Hein, "Precise Real-Time Differential GPS Positioning Using On-the-fly Ambiguity Resolution," Proceedings of the RION Satellite Navigation Conference, London, England, November, 1991. This processing method is generally termed "Kinematic GPS" or "Carrier-Ranging" in the literature. In the prior art, GPS carrier measurements from a ground-based reference receiver and the airborne receiver are processed to solve for the precise relative position of the aircraft with respect to the ground facility. Test results have demonstrated real-time positioning accuracies of better than 10 cm using the method described by Landau et al., which is sufficient to meet CAT I, II, and III precision approach accuracy requirements. However, the GPS satellite constellation does not provide sufficient coverage and redundancy to meet these operational requirements for a precision approach and landing system.

One solution that has been proposed by the RTCM Special Committee No. 104 and others to improve the GPS satellite coverage is to augment the GPS satellite measurements with a range observation from a ground-based transmitter, i.e. a pseudolite. In accordance with the teachings of the prior art, pseudolites have been proposed that broadcast a signal at the same frequency as GPS (1575.42 MHz) so that the aircraft receiver can process this measurement as though it were another satellite. However, a pseudolite with this signal format will also act as a jammer to users operating near the transmitter, thereby preventing the receiver from tracking the GPS satellites. This interference problem renders this technique unacceptable for use in a precision approach and landing system. The SC-104 reference, supra, and A.J. Van Dierendonck, "Concepts for Replacing Shipboard Tacan with Differential GPS," ION Satellite Division Third International Technical Meeting, Sept., 1990, describe a time-slotted signal structure for a pseudolite which somewhat alleviates the foregoing problem. However, this pseudolite signal will still jam satellite signals at close range. Moreover, the time-slotted or pulsed signal format does not allow contiguous carrier phase measurements to be made of the pseudolite signal. This means that the pseudolite signal cannot be included in the carrier-ranging navigation solution, and the time-slotting also affects the use of the pseudolite signal as a high-rate communication link for differential corrections.

To avoid the possibility of the pseudolite signal jamming the satellite signals, the pseudolite signal can be broadcast at a different frequency from that of the GPS satellites. This is a similar approach to that described in U.S. Pat. No. 4,866,450 to Chisholm wherein a ranging reference signal modulated with correction data is broadcast from a ground-based transmitter synchronized with GPS time. However, in accordance with the teachings of Chisholm, the signal is again time-slotted and so has the same disadvantages as the pseudolite design described in the SC-104 reference, supra. Another disadvantage of the method described in the Chisholm patent is that a second receiver is required in the aircraft to process the ground station signals broadcast at the second frequency. The timing and frequency offsets between the GPS and second receiver will introduce a significant offset between the range measurements made by the two receivers. Although the additional measurement will improve the solution geometry, the receiver offset will degrade the performance of the differential solution. Therefore, it is not believed that the teachings of Chisholm represent an improvement over those of Joquet et al. Based on test results, both of these methods will only meet a relaxed "Near CAT I" precision approach requirement, as described in Braff et al., supra.

SUMMARY OF THE INVENTION

It is the principal object of the present invention to provide a precision approach and landing system for aircraft that is capable of the required accuracy, reliability, and continuity of service requirements of such systems.

This and other objects are accomplished in accordance with the illustrated preferred embodiment of the present invention by providing both a reference receiver and a pseudolite at a fixed facility on the ground and a single broadband GPS receiver on the aircraft.

The GPS reference receiver tracks the GPS satellite and pseudolite measurements and computes the differential GPS corrections based on knowledge of the location of the GPS reference receiver. This method represents an improvement over the prior art in that both pseudo-range and carrier-range corrections are included in the differential GPS message. This allows both a differential GPS solution to be computed using the pseudo-range measurements and a kinematic GPS solution to be computed using the carrier-phase measurements. In prior art real-time kinematic GPS implementations, such as described in the Landau et al. reference, supra, the complete measurement set is broadcast from the reference receiver to the aircraft, thereby requiring a high bandwidth data link (9.6 kbps). The differential carrier ranging (DCR) solution of the present invention represents an improvement over conventional kinematic GPS techniques in that only the carrier phase corrections are transmitted to the aircraft, rather than a complete set of pseudo-range and carrier-phase measurements. This allows a kinematic GPS solution to be implemented using only a 1 kbps data link up to the aircraft receiver.

The pseudolite transmits a PRN code modulated on an L-band carrier signal, synchronized with GPS time through a timing signal provided by the reference receiver. In the preferred embodiment, the pseudolite signal is broadcast in the aeronautical radionavigation (earth-to-space) band (1610–1626.5 MHz), which is aproximately 50 MHz above the L1 GPS frequency, although other frequency selections are possible. This signal is sufficiently distant, in frequency, from the GPS satellite signals that it will not interfere with GPS operation. The spread spectrum characteristics of the pseudolite signal allow it to be broadcast at sufficiently high power to operate at a distance of 100 km, for example, from the airport, yet not interfere with mobile communications services operating in this frequency band. The spread spectrum signal characteristics of the pseudolite signal also allow mutliple pseudolites to operate on the same frequency. The aircraft receiver can uniquely identify each pseudolite transmitter through its assigned PRN code. The pseudolite signal format includes a 1000 bps data capacity that is used for broadcasting the DCR corrections to the aircraft. The pseudolite message may also include details of the approach path to be used and other information of assistance in performing a precision approach and landing.

The aircraft makes measurements of both the L1 GPS satellite signals and the L-band pseudolite signals using a broadband GPS receiver described in detail hereinbelow. The broadband GPS receiver of the present invention represents an improvement over the prior art in that it is capable of making phase coherent measurements on both the GPS and pseudolite signals even though they are at different frequencies. Another advantage of the present invention over the prior art is the ability of the broadband GPS receiver to also process signals received from the GLONASS satellite constellation. The GLONASS global navigation satellite system includes twenty-four satellites that broadcast ranging signals in the frequency band of $(1602.5625-1615.5)+0.511$ MHz. Since this frequency band lies between the L1 GPS frequency and the proposed pseudolite frequency, the broadband GPS receiver is capable of including GLONASS satellite measurements with the GPS and pseudolite measurements when computing its navigation solution. To permit differential corrections to be included in the message for the GPS, GLONASS, and pseudolite signals, the broadband GPS receiver is also used as the reference receiver.

BRIEF DESCRIPTION OF THE DRAWINGS

FIG. 14 is an illustration of a typical differential carrier ranging (DCR) message transmitted by the pseudolite to the broadband GPS receiver on board the aircraft of FIG. 1.

DETAILED DESCRIPTION OF THE INVENTION

Figure 1:
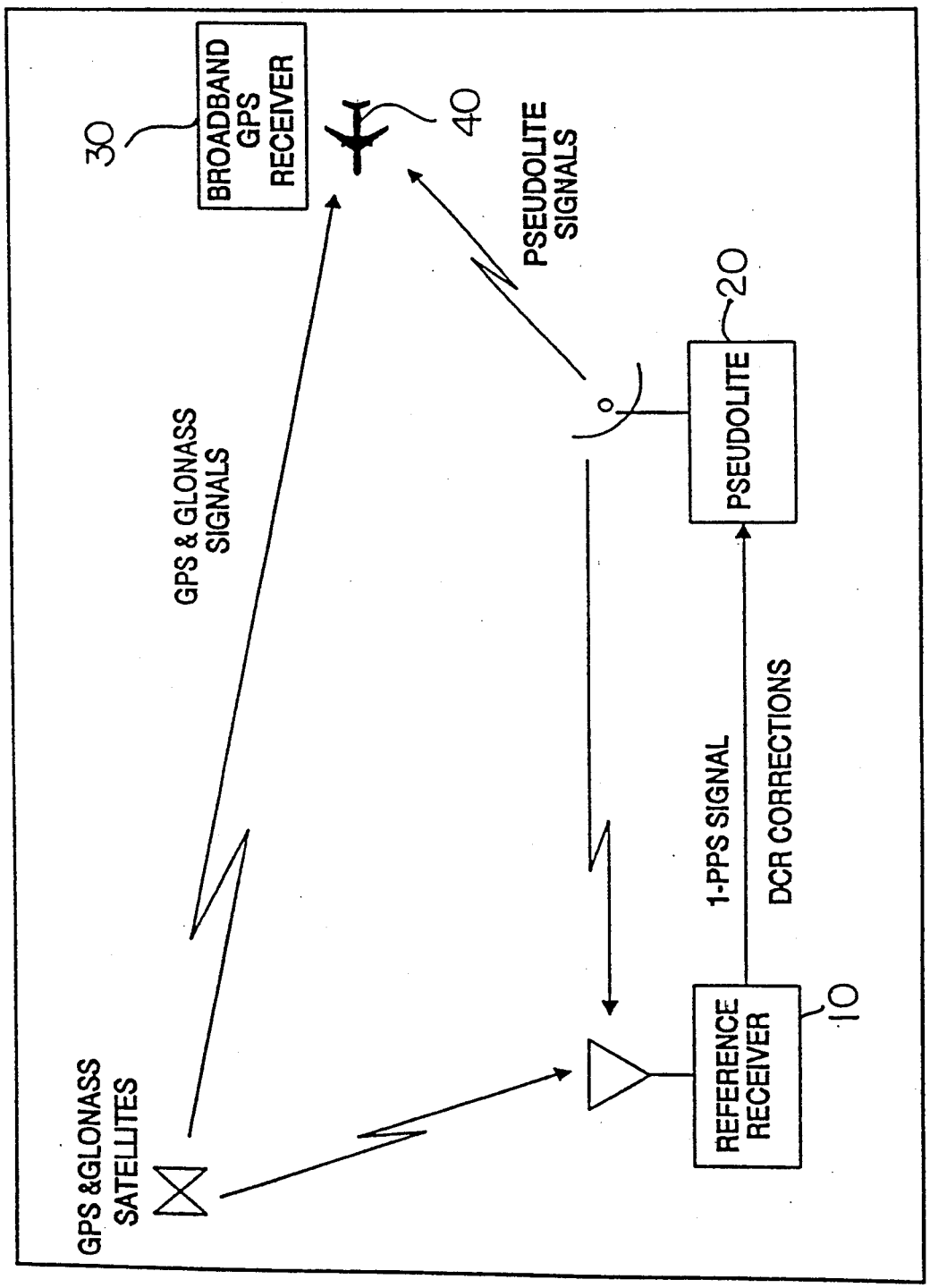
FIG. 1 is a block diagram illustrating the primary components of a GPS precision approach and landing system for aircraft in accordance with the present invention.

Referring now to FIG. 1, the apparatus and method comprising the GPS precision approach and landing system for aircraft of the present invention utilizes several satellites of the GPS or GLONASSS satellite radionavigation systems and comprises a fixed ground station constituting a reference receiver 10 and a pseudolite 20, and a broadband GPS receiver 30 located on board an aircraft 40. The reference receiver 10 tracks the satellite and pseudolite signals and computes the differential corrections to be broadcast to the aircraft receiver 30. The pseudolite 20 generates a signal synchronized to GPS time and modulated with the computed differential corrections. The broadband GPS receiver 30 on board the aircraft 40 tracks the satellite and pseudolite signals, corrects the pseudo-range and carrier measurements with the differential data modulated on the pseudolite signal and computes the precise three-dimensional position of the aircraft 40. This position information is used to provide guidance to the aircraft 40 during a precision approach and landing procedure to a proposed landing site. The location of the landing site may also be included in the data message broadcast by the pseudolite 20.

While this invention is susceptible of many different embodiments, there is shown in the appended drawings and described herein one specific embodiment that is considered to be an exemplification of the priciples of the invention and is not intended to limit the invention to the specific embodiment illustrated.

Figure 2:
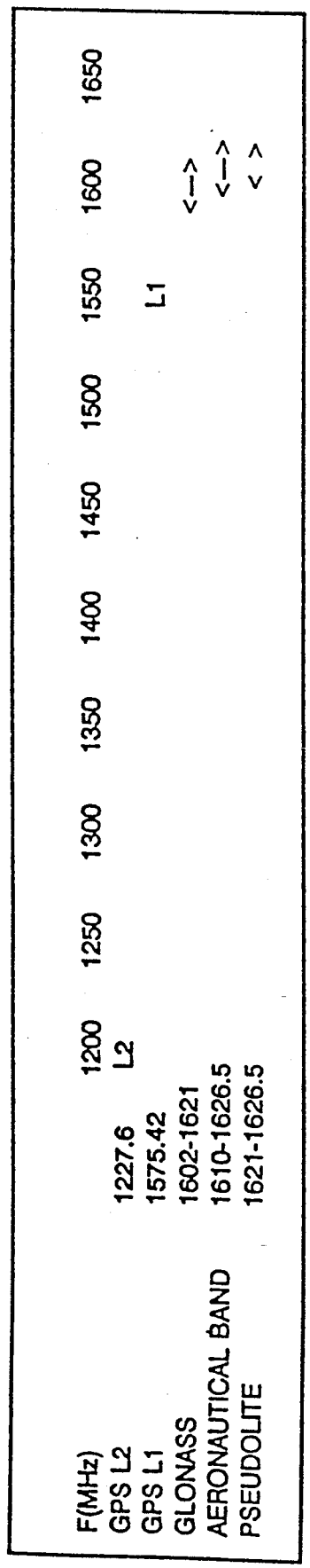
FIG. 2 is a diagram illustrating the frequencies of the satellite and pseudolite signals employed in the GPS precision approach and landing system for aircraft of FIG. 1.

Referring now to FIG. 2, the frequencies employed by the GPS and GLONASS satellite systems are illustrated. In the illustrated preferred embodiment of the present invention, the pseudolite signal is broadcast in the upper region of the aeronautical radionavigation band (1621-1626.5 MHz) to prevent interference with the GLONASS satellites or with radio astronomy signals. In the preferred embodiment, the pseudolite 20 operates on a carrier frequency of 1624 MHz.

Figure 3:
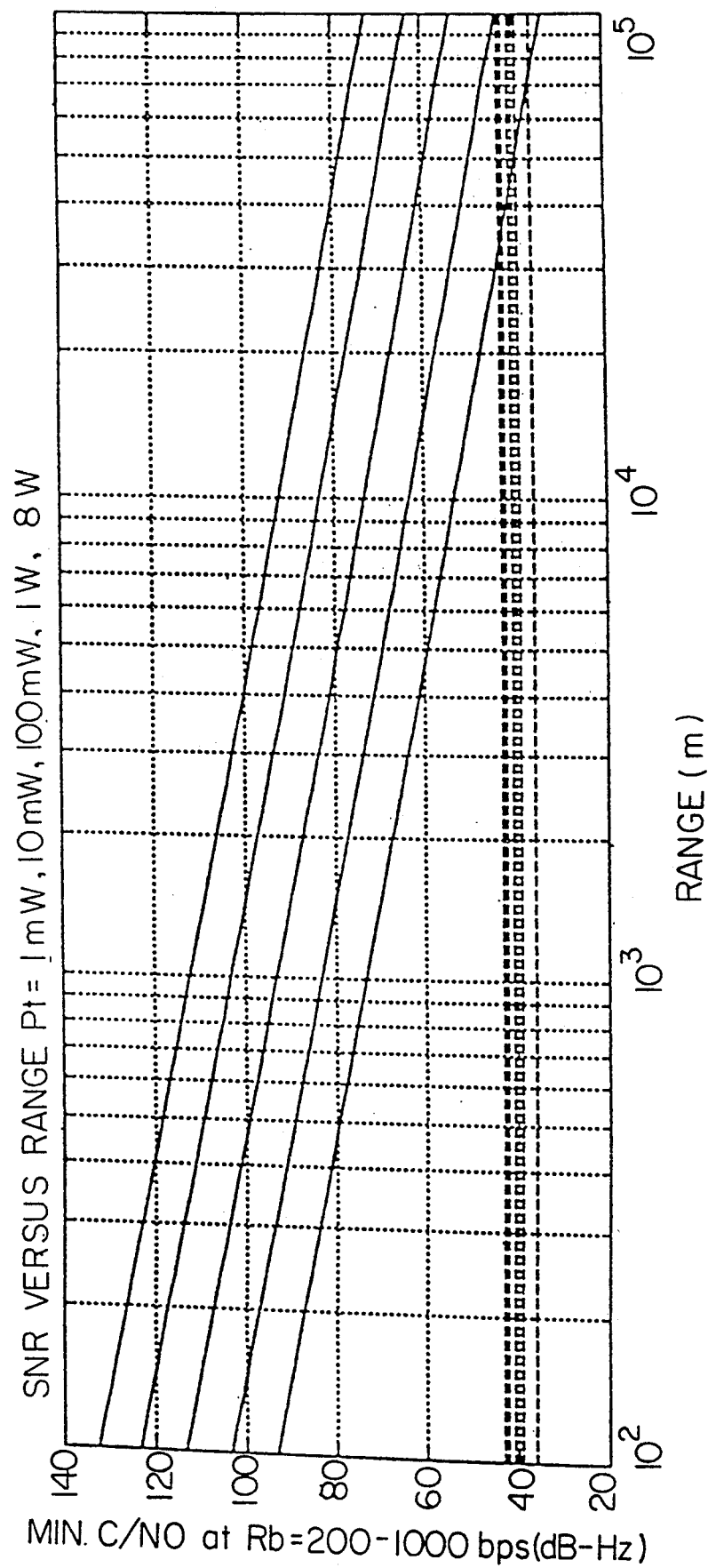
FIG. 3 is a graph illustrating pseudolite signal/noise ratio as a function of the distance between the aircraft and the pseudolite.
Figure 4:
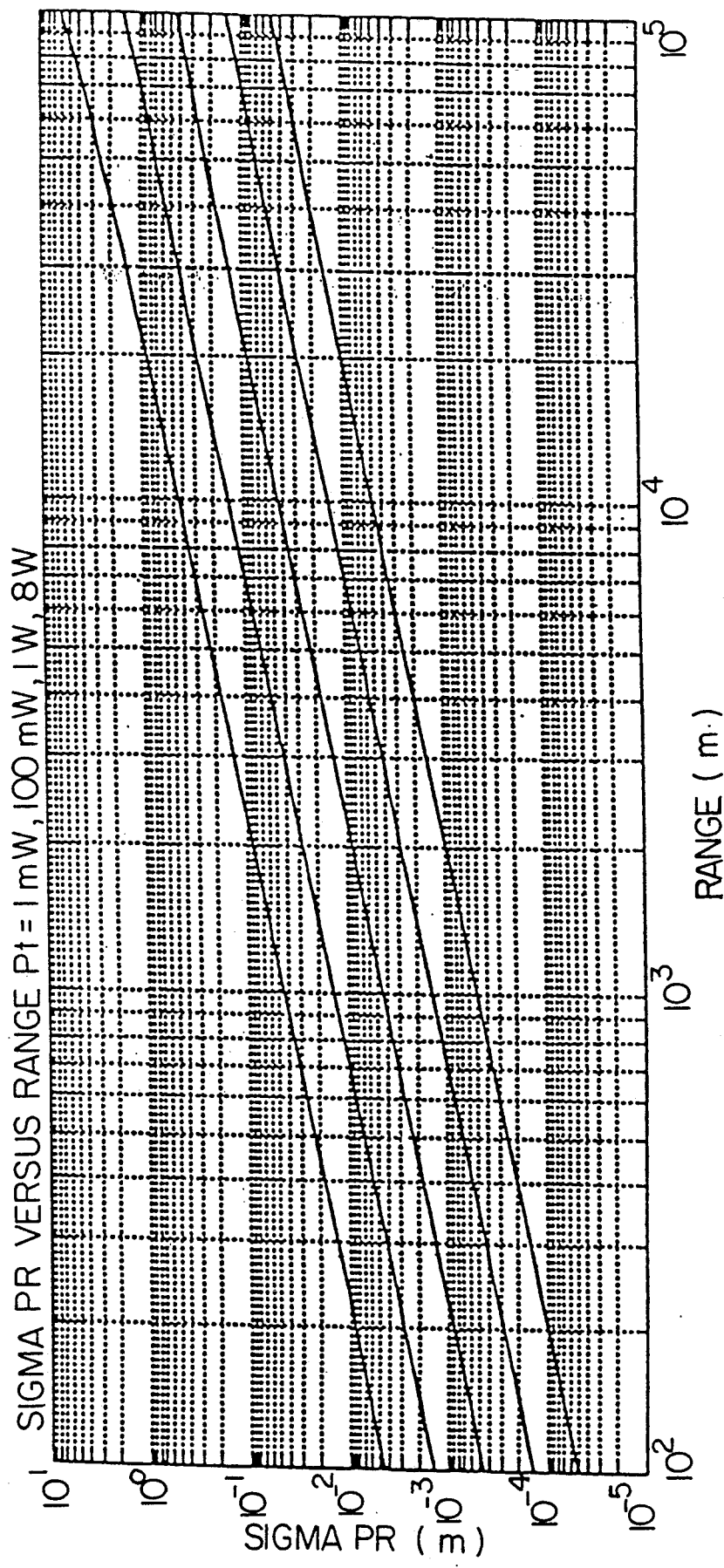
FIG. 4 is a graph illustrating the accuracy of the pseudolite measurement made by the broadband GPS receiver of FIG. 1 as a function of distance from the transmitter.

The pseudolite signal format is described by the equation $PL(t) = S\ D(t)\ CA(t) \cos 2\pi f_{PL} t$, where S is the signal amplitude, D(t) is a 1000 bps data stream, CA(t) is one of the 1023 C/A codes possible using the code generation method employed by the GPS satellites, and $f_{PL}$ is the carrier frequency of the pseduolite signal. The typical signal/noise ratio of this signal received at the aircraft 40 is illustrated in FIG. 3 as a function of distance of the aircraft 40 from the pseudolite 20. To allow the 1000 bps data (D(t)) to be demodulated reliably from the pseudolite signal (BER<10-12) an Eb/NO figure of 14 dB is required. In accordance with the preferred embodiment, the pseudolite signal power is set at 100 mw which provides reliable operation at ranges out to 100 km from the airport. The accuracy of the pseudo-range measurement made by the code tracking loops in the aircraft receiver 30 is a function of the received signal/noise ratio. An advantage of the present invention is the increase in precision of the pseudolite measurement as the aircraft 40 approaches the fixed ground facility. The pseudolite measurement variance is shown in FIG. 4 as a function of the range to the aircraft 40, assuming that a conventional delay-locked loop having a bandwidth of 1 Hz is implemented in the aircraft receiver 30. Given a 100 mw pseudolite signal, the pseudo-range accuracy varies from 0.44 meters at 100 km to better than 5 mm at distances of less than 1 km. The pseudolite measurement precision is much better than the satellite measurements since the pseudolite signal is received at a higher level. Since the pseudolite signal is offset in frequency from both the GPS and GLONASS satellites, it does not interfere with their operation.

Figure 5:
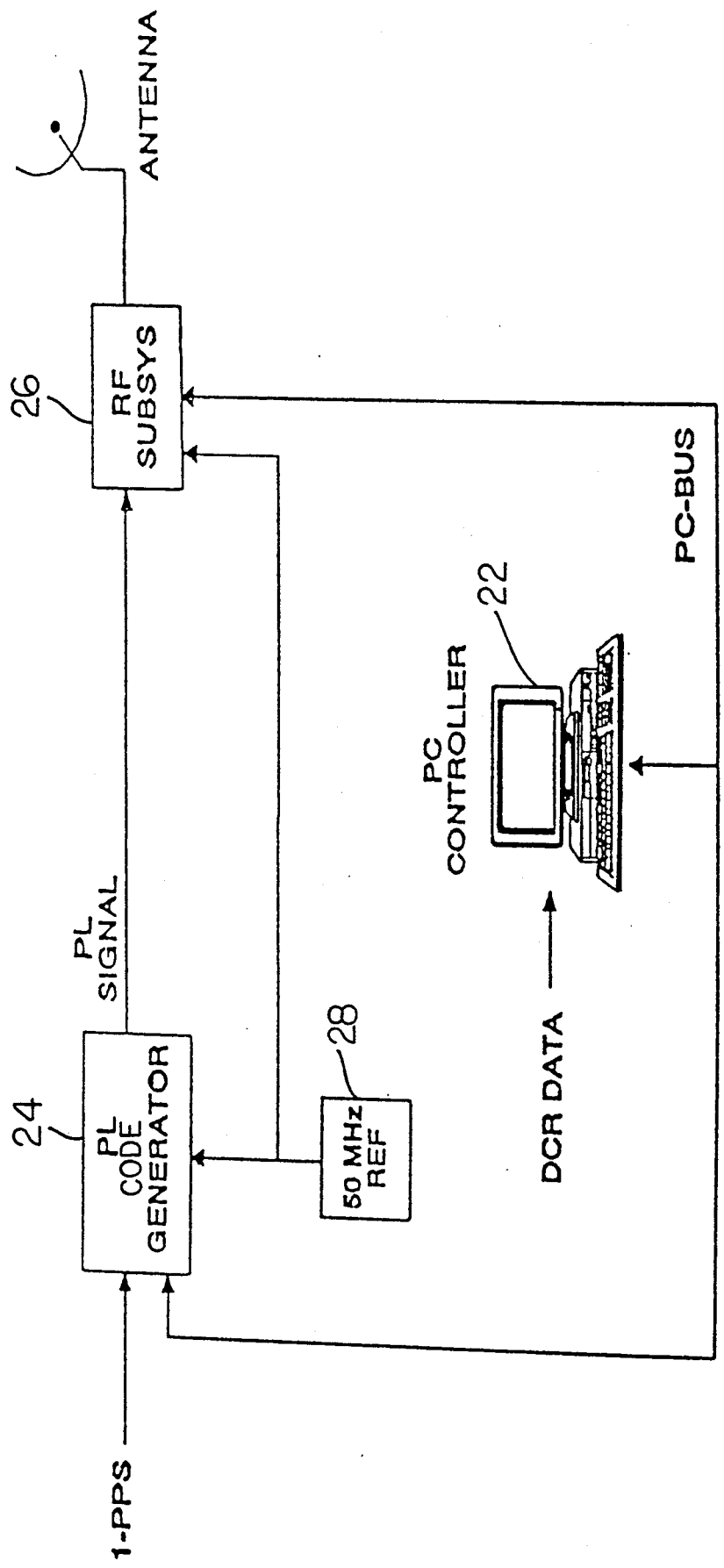
FIG. 5 is a block diagram illustrating one embodiment of the pseudolite of FIG. 1.
Figure 6:
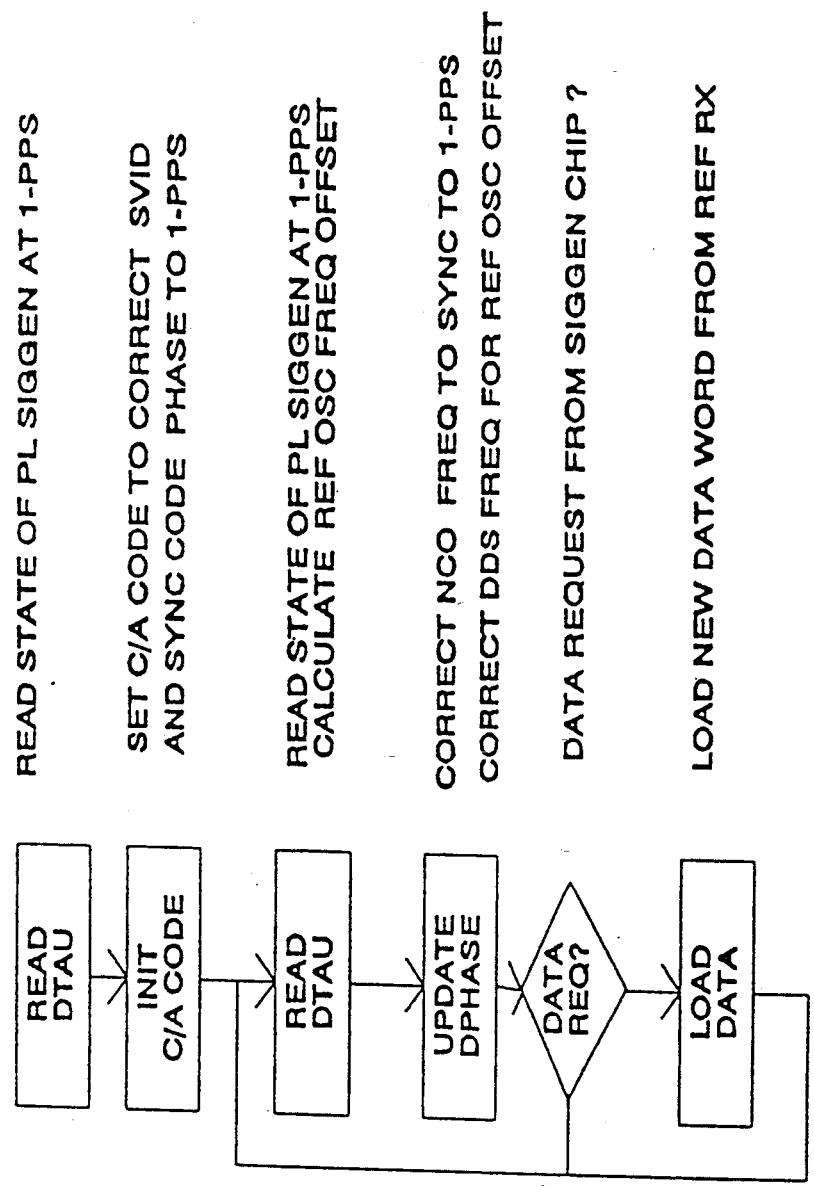
FIG. 6 is a flow diagram of the software employed by the pseudolite PC controller of FIG. 5.

Referring now to FIG. 5, the pseudolite 20 comprises a PC controller 22, a pseudolite code generator 24, and an RF subsystem 26. The PC controller 22 executes the software illustrated in FIG. 6 to operate the pseudolite 20 and to precisely synchronize the broadcast signal to a 1-pps input. This 1-pps signal is synchronized to GPS time by the reference receiver 10 of FIG. 1. A design feature of the GPS precision approach and landing system of the present invention insures that any offset from GPS time in this I-pps signal does not affect performance, since the reference receiver 10 also tracks the pseudolite signal and provides a DCR correction for the pseudolite 20, in addition to the other satellites, in the DCR message.

Figure 7:
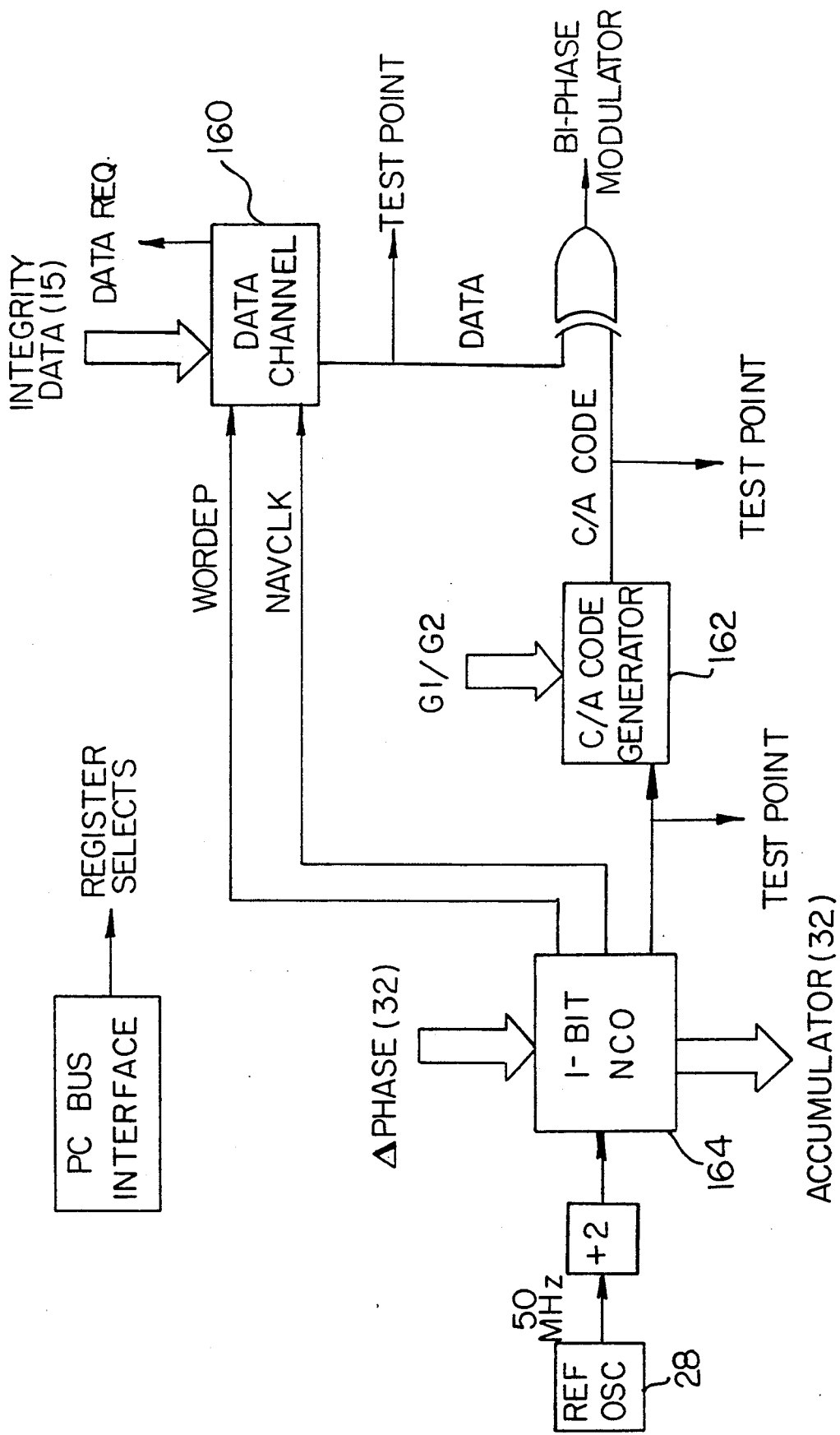
FIG. 7 is a block diagram illustrating one embodiment of the pseudolite code generator section of the pseudolite of FIG. 5.

Referring now to FIG. 7, the PC controller 22 selects the C/A code to be broadcast by the pseudolite 20 (1-1023) and synchronizes the code on the pseudolite signal with the 1-pps signal using the DTAU output from the signal generator 24. The DTAU output measures the state of a NAV data channel 160, a C/A code generator 162, and an NCO 164 at the 1-pps trigger. The phase and frequency of the C/A code broadcast by the pseudolite 20 is adjusted by the control loops in the PC controller 22 software of FIG. 6 by varying the code frequency entered into the signal generator code NCO 164. This adjusts the nominal 1.023 MHz frequency of the C/A code generator 162 and the phase of the C/A code to synchronize them exactly with the 1-pps transitions. NCO 164 comprises a 32-bit NCO to allow the code frequency to be defined to a resolution of 5.8 MHz.

Figure 8:
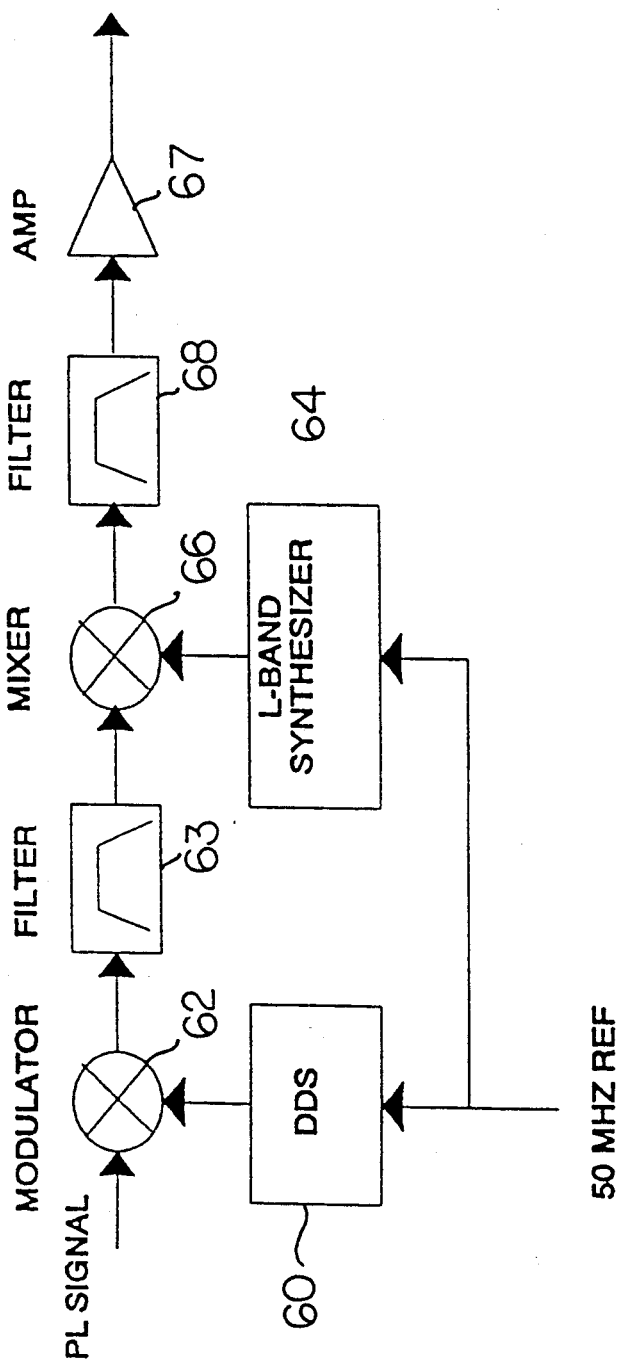
FIG. 8 is a block diagram illustrating one embodiment of the RF subsystem of the pseudolite of FIG. 5.

Referring now to FIG. 8, the signal generator carrier frequency is generated using a 48-bit direct digital synthesizer (DDS) 60 which, like the C/A code generator 162 of FIG. 7, is driven by the 50 MHz reference oscillator 28. The frequency of DDS 60 is offset by the estimated reference oscillator frequency offset derived in the PC controller 22 software of FIG. 6 to calibrate for the 50 MHz reference oscillator 28 error relative to the 1-pps signal. The frequency of DDS 60 is also corrected to adjust for the reference oscillator frequency offset in an L-band synthesizer 64.

The PC controller 22 also receives the DCR corrections from the reference receiver 10 and formats them to be modulated on the pseudolite signal. The navigation data words are passed to the pseudolite code generator 24 where they are included in the pseudolite signal.

The pseudolite code generator 24, illustrated in FIG. 7, is implemented on a single chip and is installed on a card in the bus of the PC controller 22. The C/A code generator 162 can be set at any phase of the 1023 possible C/A codes by correctly initializing the G1 and G2 shift registers. The frequency of the C/A code is set using the 32-bit DelPhase input to the code NCO 164.

The initial phase of the C/A code signal is set to be synchronized with a 1-pps input (GPS time). The frequency is synchronized with the 1-pps signal by measuring the code phase offset (to 2-32 of a chip) at each 1-pps increment and adjusting the DelPhase input to correct for any offset.

The data words to be modulated on the pseudolite signal are provided as inputs from the PC controller 22. The data rate can be selected by the PC controller 22 to be any interval of 1 msec from 1 kHz (1 msec period) to 50 Hz (20 msec period). The chip outputs the C/A code signal exclusive-ORed with the navigation data signal provided by data channel 160. This output signal is used to modulate the pseudolite carrier in the RF subsystem 26 of pseudolite 20.

Referring further to FIG. 8, there is shown a representative implementation of the RF subsystem 26 of FIG. 5 that includes the DDS synthesizer 60, a BPSK modulator 62, a pair of bandpass filters 63 and 68, an L-band synthesizer 64, and an output stage mixer 66 and amplifier 67. The DDS synthesizer 60 generates an IF carrier at a nominal frequency of 24 MHz which can be frequency and phase adjusted relative to the 50 MHz reference oscillator 28. The IF frequency is synchronized to GPS time under software control from the PC controller 22. The DDS synthesizer 60 employs a high-precision digital accumulator, sin ROM, D/A converter, and filter to generate a sinusoid with better than milli-Hertz frequency resolution.

The BPSK modulator 62 introduces the pseudolite signal onto the IF carrier by either passing or phase reversing the carrier based on the pseudolite signal bits, depending on the binary state (1 or 0). The modulated signal is applied to the bandpass filter 63 to limit the spectrum to the 5 MHz width of the pseudolite band.

The L-band synthesizer 64 generates the high frequency local oscillator signal at a frequency of 1600 MHz. This L-band synthesizer 64 is locked to the same 50 MHz reference oscillator 28 used to develop the pseudolite signal and IF carrier. The LO signal is used to mix the IF signal to the pseudolite output frequency of 1624 MHz. This stage is followed by the bandpass filter 68 prior to amplification by output amplifier 67.

The output amplifier 67 is used to amplify the signal to a 20 dBm (100 mW) power level for transmitting the pseudolite signal. The output amplifier 67 operates in class A with sufficient linearity to meet the out-of-band spectrum suppression requirements.

Figure 9:
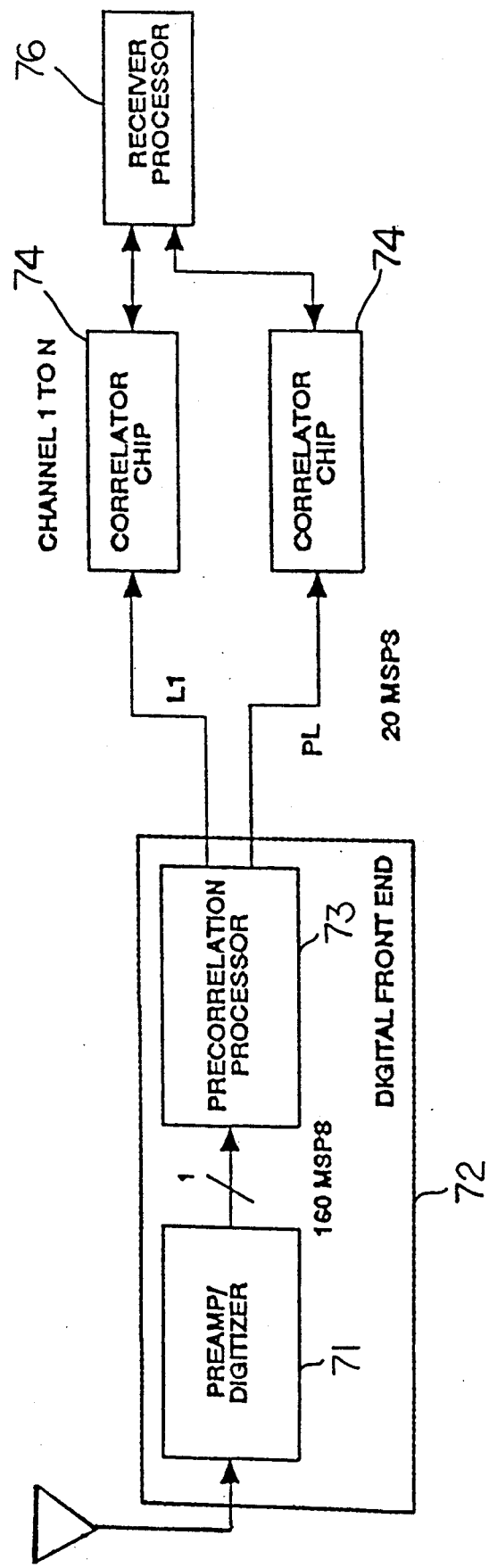
FIG. 9 is a block diagram illustrating one embodiment of the broadband GPS receiver employed as the reference receiver on the ground and as the receiver on board the aircraft in the GPS precision approach and landing system of FIG. 1.

Referring now to FIG. 9, there are shown the primary components of the broadband GPS receiver (BGR) 30 of FIG. 1 that is employed to track the GPS, GLONASS, and pseudolite signals in the fixed ground station and on board the aircraft 40. The BGR 30 comprises a digital front end 72, correlation chips 74, and a microcomputer 76. A representative implementation of the digital front end 72 comprises a preamplifier/digitizer subsystem 71 and multiple precorrelation processors 73. The purpose of the preamplifier/digitizer 71 is to convert the received L-band signal spectrum into a high rate digital data stream. This data is processed by the precorrelation processor 73 to digitally filter the data down to a lower bandwidth digital data sequence at a selected frequency in the broadband receiver frequency range. These digital data sequences are then processed in the correlator chips 74 in a similar fashion to the data provided from a conventional digital GPS receiver design, such as those described in "All-Digital GPS Receiver Mechanization," P.C. Ould and R.J. VanWechel, Global Positioning System papers, Vol. II, pp. 25-36, published by the Institute of Navigation. The highly digital architecture of the BGR design eliminates unknown phase variations between the different signal processing channels.

Figure 10:
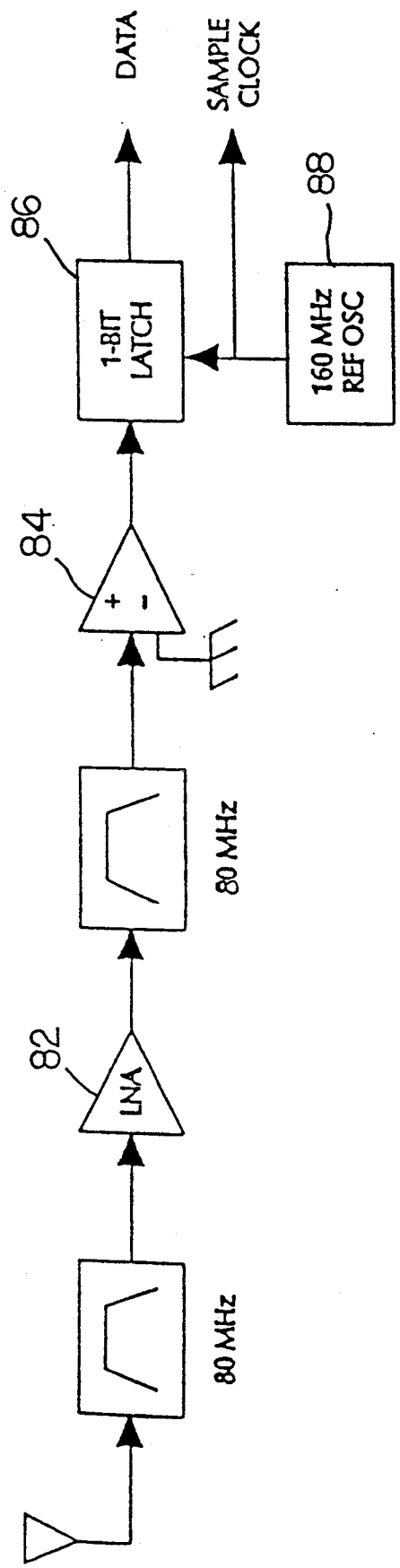
FIG. 10 is a block diagram illustrating one embodiment of the preamplifier/digitizer system employed in the broadband GPS receiver of FIG. 9.

Referring now to FIG. 10, there is shown a representative implementation of the preamplifier/digitizer subsystem 71 of FIG. 9. The antenna output signal is band-limited to 80 MHz centered at 1600 MHz (approximately midway between the L1 GPS frequency and the pseudolite frequency) to eliminate out-of-band interfering signals. The bandlimited signal is amplified by a wideband low-noise amplifier 82 to set the system noise figure. The amplified signal is again bandlimited to 80 MHz centered at 1600 MHz to bandlimit the noise. This bandlimited signal is quantized to 1 bit by a GaAs comparator 84 and sampled by a GaAs latch 86. A sampling clock signal is generated from a low phase noise 160 MHz reference oscillator 88. The 160 Mbps digitized signal data is provided to the precorrelation processor 73 along with the 160 MHz sampling clock signal.

The 160 MHz sampling rate was selected to provide the capability for processing the GPS, GLONASS, and pseudolite signals at the proposed frequency. Other sampling rates can be accommodated simply by changing the initial filter bandwidth and the sampling clock rate.

Figure 11:
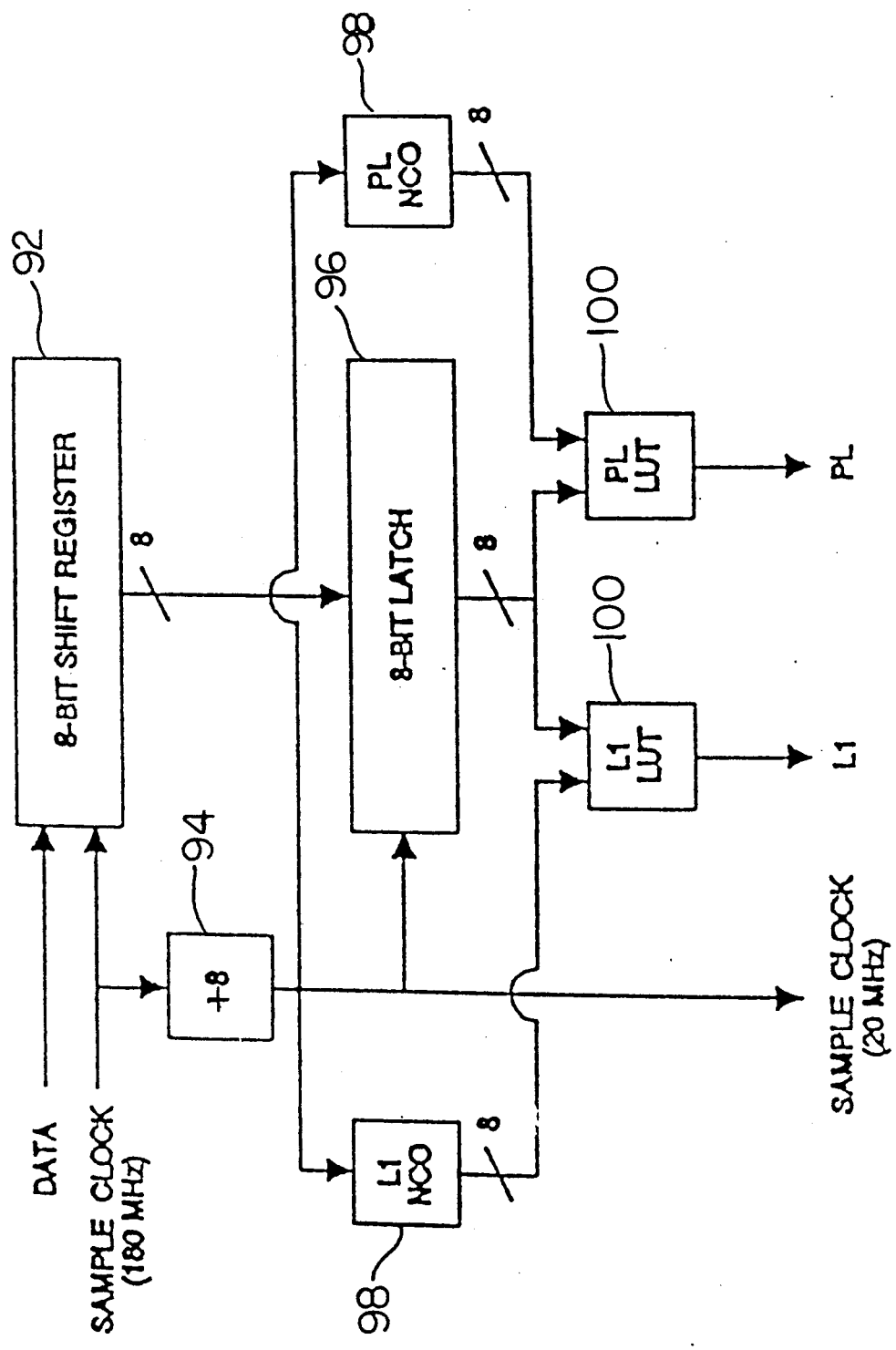
FIG. 11 is a block diagram illustrating one embodiment of the precorrelation processor subsystem employed in the broadband GPS receiver of FIG. 9.

Referring now to FIG. 11, there is shown a representative implementation of the precorrelation processor 73 of FIG. 9. The sampled signal data is clocked into an 8-bit ECL shift register 92 by the 160 MHz sampling clock signal provided by reference oscillator 88. The sampling clock signal is divided down to a 20 MHz logic clock by a GaAs÷8 divider 94. A 20 MHz logic clock is used to latch the state of the 8-bit shift register 92 in an 8-bit ECL latch 96. The logic clock is also used to clock two 8-bit CMOS NCOs 98, one set for L1 GPS frequency and the other set for the pseudolite center frequency. The 8 MSBs of each NCO 98 are combined with the 8-bit latch 96 to address two lookup tables (LUTs) 100, one for L1 and one for the pseudolite 20. The LUTs are used to perform a complex multiplication and accumulation operation on the 8 bits of phase ($\theta$) and the eight bits of data (D). The LUTs are loaded with the in-phase and quadrature accumulated signals as a function of the LUT 16-bit address [$\theta$,D].

$$LUT_I = \sum_{i=0}^{7} D_i \cos(2\pi f_o t_i + \theta)$$

$$LUT_Q = \sum_{i=0}^{7} D_i \sin(2\pi f_o t_i + \theta)$$

The 4-bit outputs of each of the LUTs 100 provide the filtered L1 and pseudolite signal I and Q samples at 20 MHz. These samples and the 20 MHz logic clock are provided to the correlator chips 74 of FIG. 9 for signal processing.

In the embodiment illustrated in FIG. 11, the precorrelation processor 73 includes one NCO 98 set at the L1 GPS frequency and a second NCO 98 set at the pseudolite center frequency, thereby providing data from both the GPS satellites and the signal transmitted by the pseudolite 20. By including additional NCOs 98 set at the GLONASS satellite frequencies, the precorrelation processor 73 can also provide GLONASS satellite signals to the correlator chips 74 for signal processing and eventual inclusion in the navigation solution.

Figure 12:
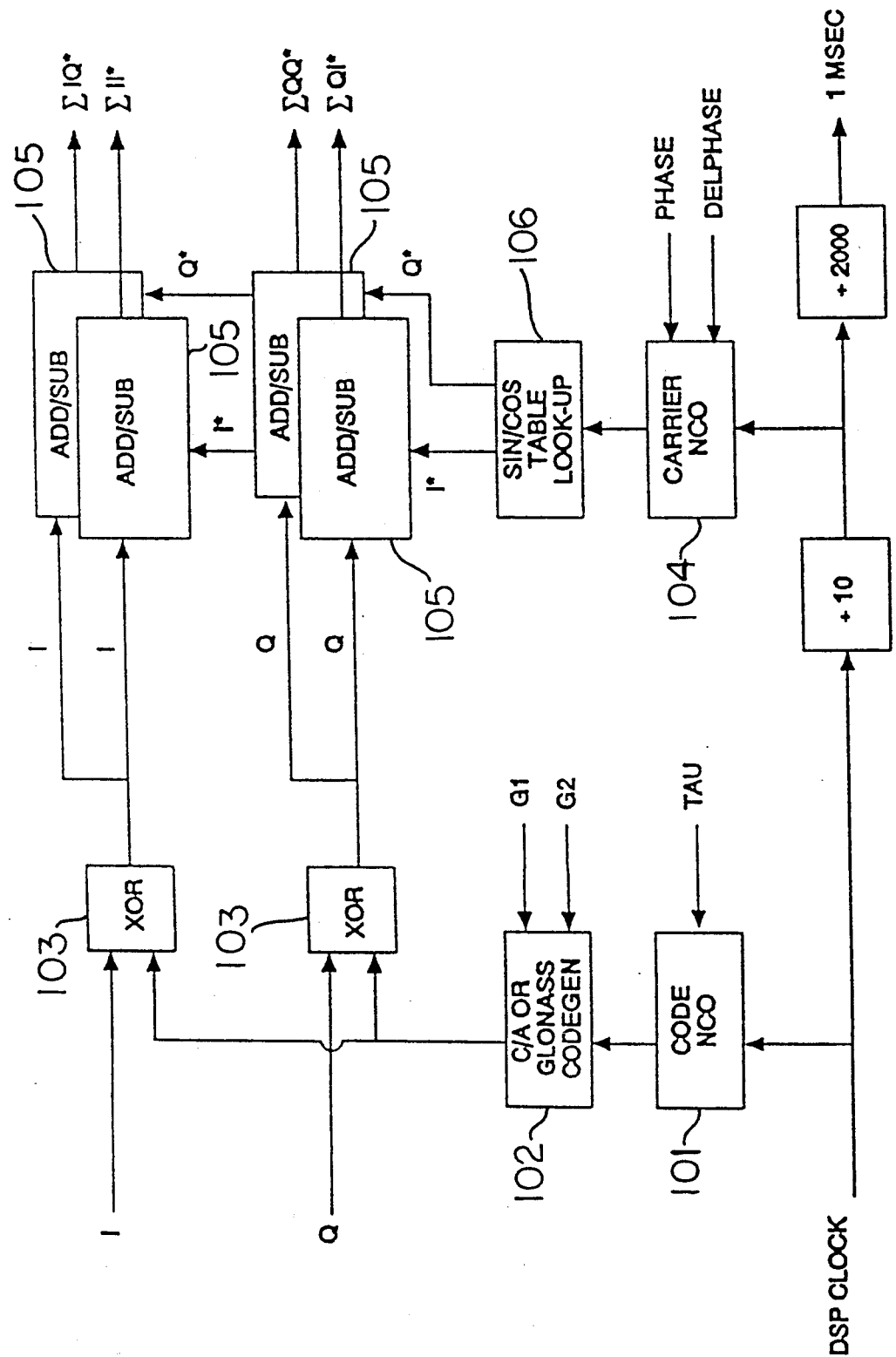
FIG. 12 is a block diagram illustrating one embodiment of the correlator chip component employed in the broadband GPS receiver of FIG. 9.

The correlator chips 74 of FIG. 9 perform the functions of code correlation, carrier mixing, and accumulation in a similar fashion to that performed in a conventional digital GPS receiver design. A representative implementation of a single correlator on the code correlator chip is illustrated in FIG. 12. Multiple correlators may be provided per chip and multiple correlator chips 74 may also be used in the BGR design to provide a multi-channel receiver architecture.

The correlator chip 74 includes the logic to generate the GPS C/A codes or the GLONASS code. The code to be tracked is selected under the receiver processor software control by downloading the G1 and G2 initial register states. A code NCO 101 is used to clock a code generator 102. The initial phase of the code NCO 101 is also set through software control at a 1 KHz rate. The code correlation function is performed through an exclusive OR (XOR) logic module 103 on the I and Q sign bits. A carrier NCO 104 is used to generate the in-phase and quadrature signals I* Q* under control from the receiver processor using a sin/cos look-up table 106. The I and Q signals are accumulated over a 1 msec period in four up-down counters 105 to form the IQ*-,II*,QI*, and QQ* complex pairs. The receiver processor software closes the code and carrier tracking loops using the 1 KHz data from the correlator chip 74.

Figure 13:
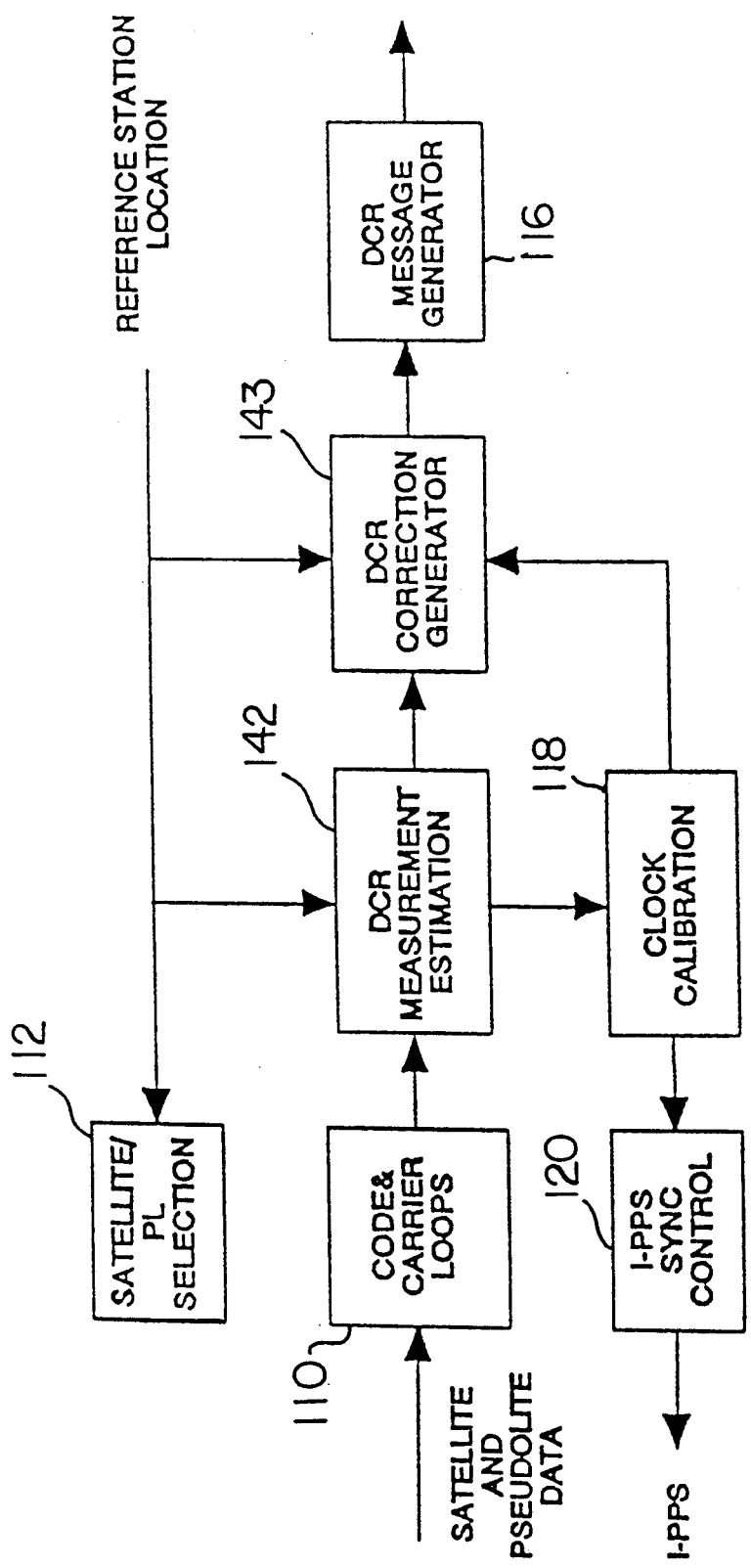
FIG. 13 is a block diagram illustrating the functions performed by the software contained in the reference receiver of FIG. 1.

A broadband GPS receiver is employed as both the reference receiver 10 and the aircraft receiver 30 of FIG. 1. The functions performed by the reference receiver 10 software are illustrated in FIG. 13. This software is executed by the receiver processor 76 of FIG. 9. A code and carrier tracking module 110 handles the interface to the correlator chips 74 and closes the code and carrier tracking loops in accordance with conventional techniques described in the Ould et al. reference, supra. The code and carrier tracking loops measure the pseudo-range and carrier phae of the GPS, GLONASS, and pseudolite signals and also demodulate the navigation data on the GPS and GLONASS signals and on the 1000 bps data included on the pseudolite signal. A conventional delay lock loop may be used to perform code tracking and to control the TAU input to the correlator chip 74. A conventional Costas loop may be used to track the carrier and to control the Phase and DelPhase NCO inputs to the correlator chip 74.

The satellites to be tracked by the correlator chips 74 are selected by a satellite selection module 112. This module also selects the satellite and pseudolite signals for which differential corrections are to be generated for broadcast to the aircraft 40.

A DCR measurement estimation module 142 computes the carrier ranges by filtering the PR measurements and solving for the carrier cycle ambiguity as is performed in a conventional kinematic GPS solution, such as that described in the Landau et al. reference, supra. The filtered PR measurements are used to estimate the ionospheric offset between the pseudo-range and the carrier phase observations and also to "bias fix" the carrier phase measurements to create carrier ranges.

In the DCR correction generator module 143, the carrier-range measurements are corrected for the receiver clock offset and used to estimate the range and range rate corrections to be broadcast to the aircraft receiver 40. A DCR message generation module 116 generates the DCR message to be broadcast on the pseudolite signal. In order to minimize the delay time, this message is sent one word at a time to the pseudolite 20. Each subframe includes the most recent DCR corrections, each with its current reference time (Z-count). A representative message format is illustrated in FIG. 14.

A clock calibration module 118 employs a filter having a long time constant to compute the best estimate of the receiver clock offset from GPS time. A 1-pps synchronization control module 120 is used to control a 1-pps signal output so that it is synchronized to the best estimate of GPS time. This signal output is provided to the pseudolite 20 to synchronize the pseudolite signal to GPS time.

Figure 15:
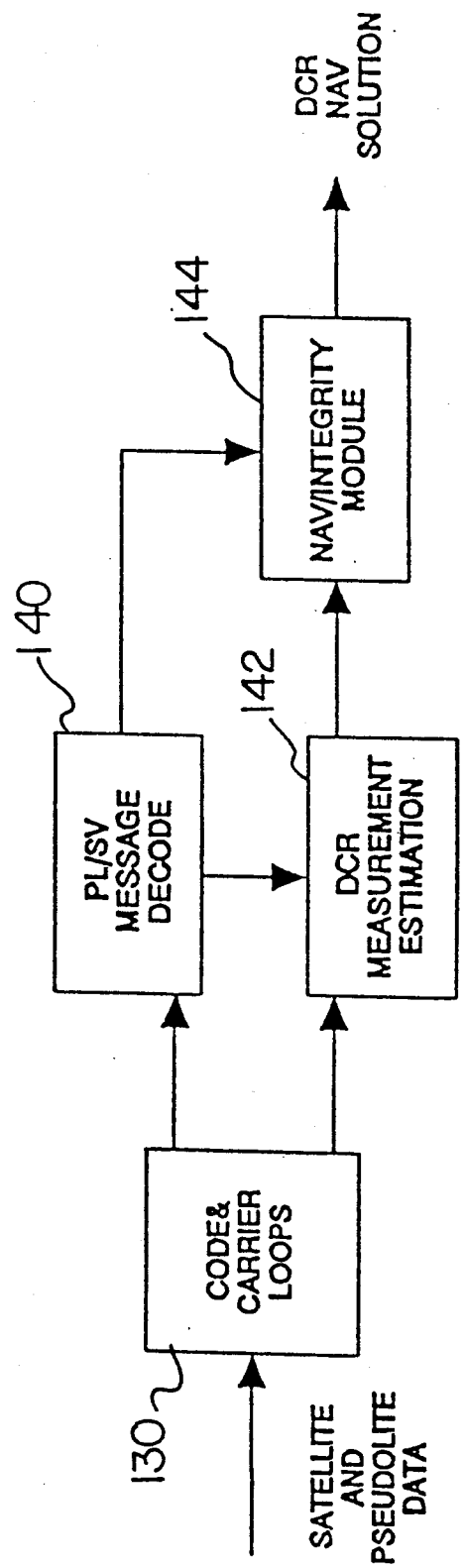
FIG. 15 is a block diagram illustrating the functions performed by the software contained within the broadband GPS receiver on board the aircraft of FIG. 1.

Referring now to FIG. 15, there is shown a functional diagram of the software included in the aircraft receiver 30. This software computes a differential carrier ranging solution from the satellite and pseudolite measurements that is used to provide guidance information to the aircraft 40 throughout the precision approach and landing.

A code and carrier tracking module 130 performs the same functions as code and carrier tracking module 110 performs in the reference receiver software shown in FIG. 13 and described above. A pseudolite message decode module 140 decodes the 1000 bps data on the pseudolite signal. This includes the DCR measurement corrections which are passed to the measurement estimation algorithm.

A DCR measurement estimation module 142 computes the carrier ranges by filtering the PR measurements corrected by the DCR data and by solving for the carrier cycle ambiguity as is performed by the reference receiver 10.

In the NAV/integrity module 144, the resulting carrier-range observations are then corrected with the DCR corrections from the pseudolite message. The carrier-range observations are passed to the NAV/integrity module 144. The differential carrier-range measurement residuals are calculated using the broadcast satellite and pseudolite positions and the current estimate of user position. The integrity check makes use of the redundancy in the satellite and pseudolite measurements to determine whether any measurements are invalid. The navigation solution is computed from the validated measurement residuals and provided to the aircraft guidance computer for computation of course deviation corrections and/or for automatic flight control.

I claim:

1. A GPS precision approach and landing system for aircraft, the system comprising:
    a pseudolite positioned at a fixed location on the ground, the pseudolite being operative for transmitting a pseudolite signal, the pseudolite signal including an assigned PRN code modulated on an L-band carrier signal having a frequency that is removed from an L1 GPS satellite frequency, the pseudolite signal being synchronized with GPS time by means of a GPS timing signal;
    a GPS reference receiver positioned at a fixed location on the ground and coupled to the pseudolite, the GPS reference receiver being operative for tracking GPS satellite and pseudolite signals and for computing differential GPS correction information comprising both pseudo-range and carrier-range correction information from reference information defining the position of the GPS reference receiver;

the pseudolite being further operative for transmitting the computed differential GPS correction information computed by the GPS reference receiver to an aircraft performing a precision approach and landing procedure;

the GPS precision approach and landing system further comprising a single receiver positioned on the aircraft, said single receiver comprising a broadband GPS receiver operative for receiving the computed differential GPS correction information transmitted by the pseudolite and for performing phase coherent measurements of L1 GPS satellite signals and L-band pseudolite signals to determine the three-dimensional position of the aircraft with respect to an approach path associated with the precision approach and landing procedure.

2. A GPS precision approach and landing system for aircraft as in claim 1 wherein the L-band carrier signal transmitted by said pseudolite is a spread spectrum signal transmitted on a frequency within the range of 1610–1626.5 MHz.

3. A GPS precision approach and landing system for aircraft as in claim 1 wherein said GPS reference receiver and said broadband GPS receiver positioned on the aircraft are both operative for receiving signals from selected satellites comprising the GLONASS global navigation satellite system to determine the three-dimensional position of the aircraft.

4. A GPS precision approach and landing system for aircraft as in claim 1 wherein said GPS reference receiver is operative for providing said GPS timing signal for synchronizing said pseudolite signal with GPS time.

5. A GPS precision approach and landing system for aircraft as in claim 1 wherein said broadband GPS receiver comprises:
a digital front end section incorporating a preamplifier/digitizer subsystem and multiple precorrelation processors to facilitate said phase coherent measurements of said L1 GPS satellite signals and L-band pseudolite signals.

6. A GPS precision approach and landing system for aircraft as in claim 5 wherein:
said preamplifier/digitizer subsystem is operative for filtering and sampling said L1 GPS satellite and L-band pseudolite signals; and
said multiple precorrelation processors include a look-up table for performing complex multiplication and accumulation operations to digitally filter said L1 GPS satellite and L-band pseudolite signals to a preselected frequency.

7. A GPS precision approach and landing system for aircraft as in claim 3 wherein said broadband GPS receiver comprises:
a digital front end section incorporating a preamplifier/digitizer subsystem and multiple precorrelation processors to facilitate said phase coherent measurements of said L1 GPS satellite signals and L-band pseudolite signals.

8. A GPS precision approach and landing system for aircraft as in claim 7 wherein:
said preamplifier/digitizer subsystem is operative for filtering and sampling said L1 GPS satellite and L-band pseudolite signals; and
said multiple precorrelation processors include a look-up table for performing complex multiplication and accumulation operations to digitally filter said L1 GPS satellite and L-band pseudolite signals to a preselected frequency.

9. A method employing GPS satellites for determining the three-dimensional position of an aircraft performing a precision approach and landing, the method comprising:
providing a pseudolite positioned at a fixed location on the ground for transmitting a pseudolite signal, including an assigned PRN code, modulated on an L-band carrier signal having a frequency that is removed from an L1 GPS satellite frequency, the pseudolite signal being synchronized with GPS time;
providing a GPS reference receiver positioned at a fixed location on the ground, the GPS reference receiver being operative for tracking GPS satellite and pseudolite signals and for computing differential GPS correction information comprising both pseudo-range and carrier-range correction information from reference information defining the position of the GPS reference receiver;
transmitting, by means of the pseudolite, the computed differential GPS correction information computed by the GPS reference receiver to said aircraft;
providing a single receiver on said aircraft, said single receiver being a broadband GPS receiver operative for receiving the computed differential GPS correction information transmitted by the pseudolite and for performing phase coherent measurements of L1 GPS satellite signals and L-band pseudolite signals to determine the three-dimensional position of said aircraft.

10. A method as in claim 9 wherein the L-band carrier signal transmitted by the pseudolite comprises a spread spectrum signal transmitted on a frequency within the range of 1610–1626.5 MHz.

11. A method as in claim 9 wherein both the GPS reference receiver and the single broadband GPS receiver on said aircraft receive signals from selected satellites comprising the GLONASS global navigation satellite system to determine the three-dimensional position of the aircraft.

12. A method employing GPS satellites for determining the three-dimensional position of an aircraft performing a precision approach and landing as in claim 9, wherein said GPS reference receiver provides a GPS timing signal for synchronizing the pseudolite signal with GPS time.

13. A method employing GPS satellites for determining the three-dimensional position of an aircraft performing a precision approach and landing as in claim 9, further comprising the steps of:
filtering and sampling said L1 GPS satellite and L-band pseudolite signals; and
performing, through use of a look-up table, complex multiplication and accumulation operations to digitally filter said L1 GPS satellite and L-band pseudolite signals to a preselected frequency.

* * * * *